United States Patent
Sweeney

[11] Patent Number: 6,145,275
[45] Date of Patent: Nov. 14, 2000

[54] APPARATUS FOR APPLYING A FITMENT TO PRE-FORMED CARTON AT THE INFEED TO A PACKAGING MACHINE

[75] Inventor: David J. Sweeney, White Bear Lake, Minn.

[73] Assignee: Tetra Laval Holdings & Finance, SA, Pully, Switzerland

[21] Appl. No.: 09/327,821

[22] Filed: Jun. 8, 1999

Related U.S. Application Data

[60] Provisional application No. 60/088,929, Jun. 11, 1998.

[51] Int. Cl.[7] ....................................................... B65B 61/18
[52] U.S. Cl. .......................... 53/412; 53/133.2; 53/133.4; 493/87
[58] Field of Search .......................... 53/410, 412, 133.1, 53/133.2, 133.3, 133.4; 493/87, 929, 213, 214

[56] References Cited

U.S. PATENT DOCUMENTS

| | | |
|---|---|---|
| 4,788,811 | 12/1988 | Kawajiri et al. ....................... 53/410 X |
| 5,058,360 | 10/1991 | Yamazaki et al. ....................... 53/133.2 |
| 5,267,934 | 12/1993 | Pape et al. ................................ 493/87 |
| 5,272,855 | 12/1993 | Togi et al. ............................ 493/87 X |
| 5,304,265 | 4/1994 | Keeler ..................................... 156/73.1 |
| 5,366,433 | 11/1994 | McCormick .......................... 493/87 X |
| 5,435,803 | 7/1995 | Owen et al. .............................. 493/87 |
| 5,484,374 | 1/1996 | Bachner et al. ................... 53/133.2 X |
| 5,601,669 | 2/1997 | Moody et al. ........................ 493/87 X |
| 5,653,832 | 8/1997 | Thompson ............................ 493/87 X |
| 5,759,143 | 6/1998 | Blain et al. .............................. 493/87 |
| 5,770,009 | 6/1998 | Blain et al. ........................... 493/87 X |
| 5,819,504 | 10/1998 | Giacomelli et al. .................. 493/87 X |

*Primary Examiner*—Daniel B. Moon
*Attorney, Agent, or Firm*—Welsh & Katz, Ltd.

[57] ABSTRACT

An apparatus for attaching a fitment to an erected carton through ultrasonic welding at an infeed to a packaging machine is disclosed herein. The apparatus has two anvils that oscillate in a horizontal plane and oscillate along a vertical plane at a carton infeed to a packaging machine. As one anvil is attaching a fitment to a carton, the other anvil picks a fitment for attachment to the next carton.

8 Claims, 11 Drawing Sheets

APPARATUS FOR APPLYING A FITMENT TO PRE-FORMED CARTON AT THE INFEED TO A PACKAGING MACHINE

CROSS REFERENCES TO RELATED APPLICATIONS

This application claims priority of U.S. Provisional application Ser. No. 60/088,929, filed Jun. 11, 1998.

STATEMENT REGARDING FEDERALLY SPONSORED RESEARCH OR DEVELOPMENT

Not Applicable

BACKGROUND OF THE INVENTION

1. Field of the Invention

The present invention relates to closure applicators. Specifically, the present invention relates to closure applicators for container blanks.

2. Description of the Related Art

Containers such as gable top cartons and the ubiquitous TETRA BRIK® parallelepiped package have always been popular as containers for liquid foods such as milk, orange juice and the like. Recently, the use of closures, or fitments, to access the contents has become very appealing to consumers due the resealability and tamper-proof features.

Numerous applicators have been invented that apply a closure/fitment to an erected carton or a completely formed, filled, and sealed carton. For example, a very efficient process for applying a fitment through a pre-cut hole in an erected carton is described in U.S. Pat. No. 5,819,504. Other applicators apply the fitment to a filled and sealed carton through use of hot melt. The packaging industry has created numerous applicators for applying a fitment to an erected carton or sealed carton, yet the industry has failed to provide a process or apparatus for applying a closure/fitment at an infeed to a packaging machine.

The failure to resolve this problem restricts application of closures/fitments to the form, fill and seal machine through either integrated machinery or machine in-line with the packaging machine. Also, current integrated fitment applicator machines require the use, or act in concert with mandrels on a packaging machine.

BRIEF SUMMARY OF THE INVENTION

It is a primary object of the present invention to provide a method and apparatus for attaching a closure to a carton blank at the infeed to a packaging machine.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a top perspective of a packaging machine with the fitment applicator apparatus of the present invention thereon;

Figure 2:
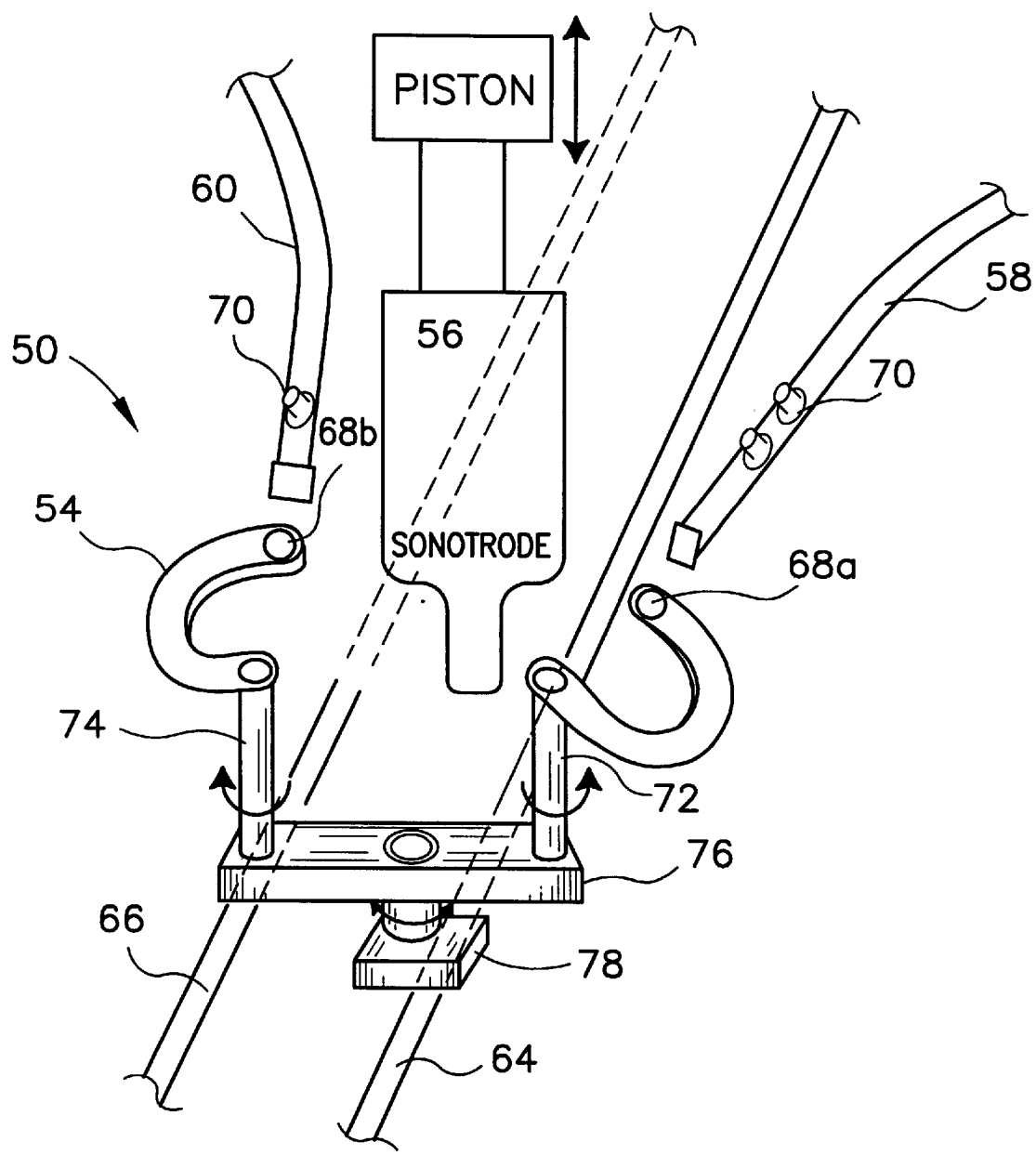
Figure 10:
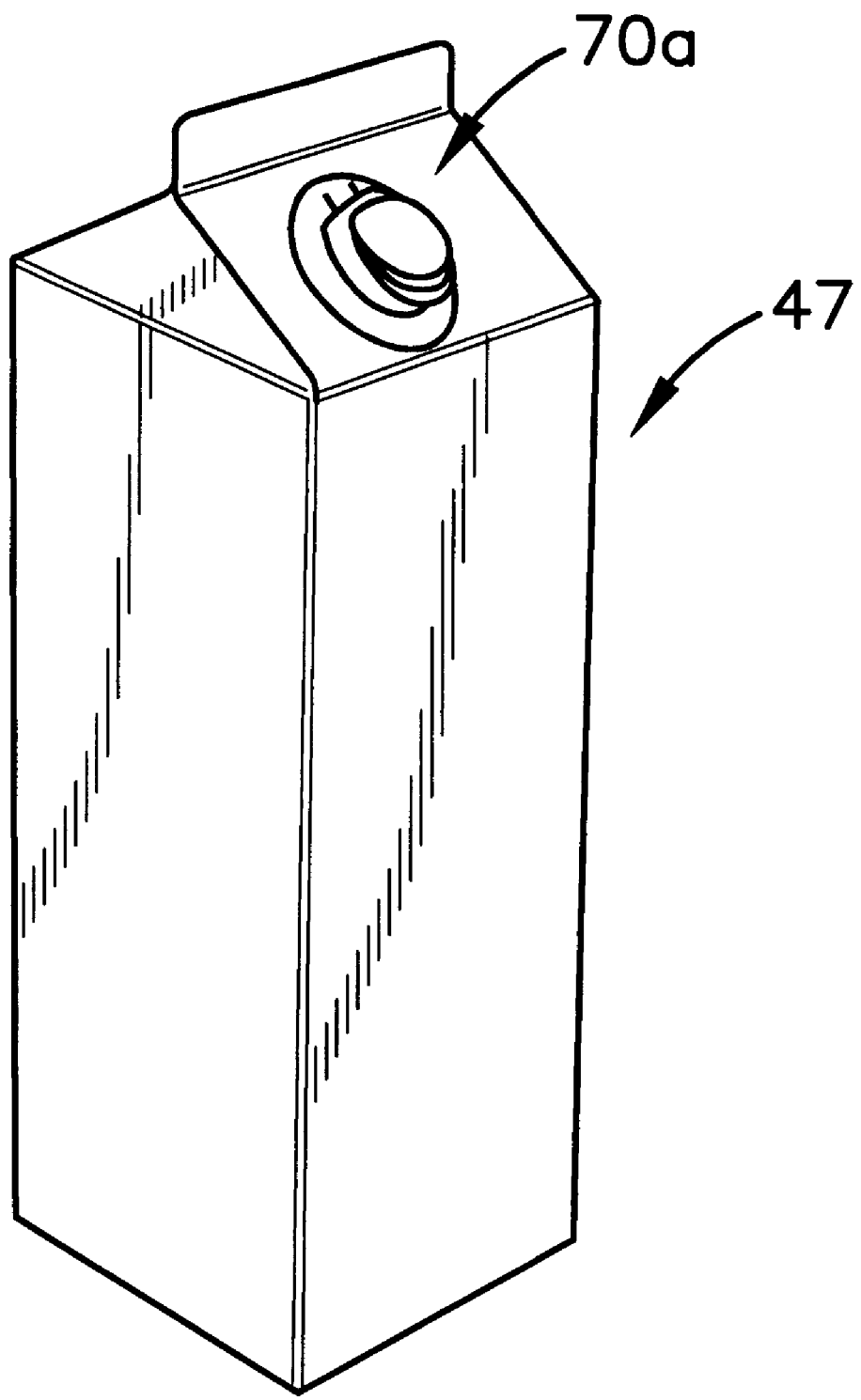
Figure 11A:
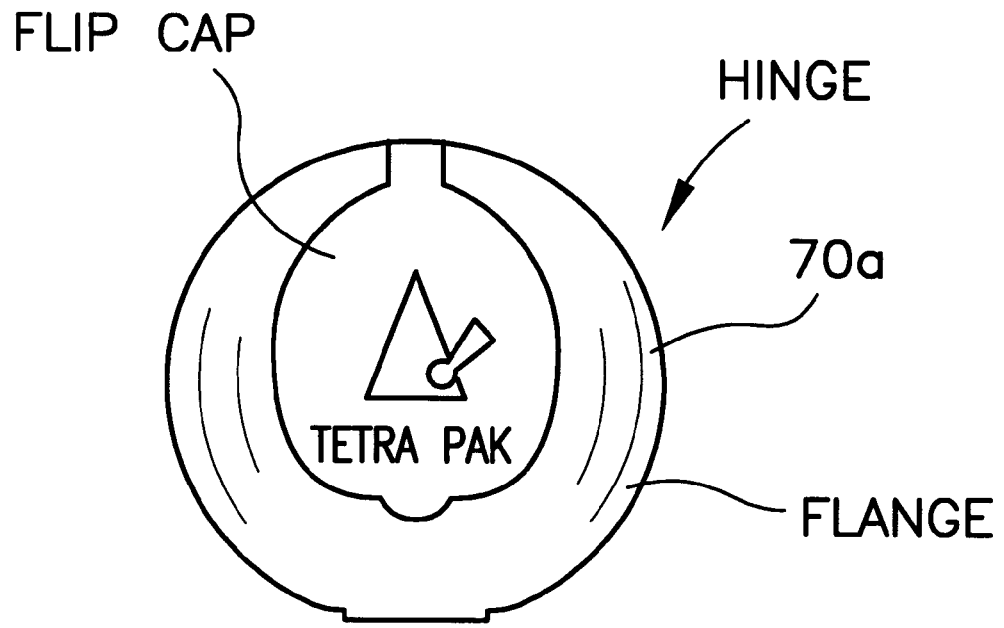
Figure 11B:
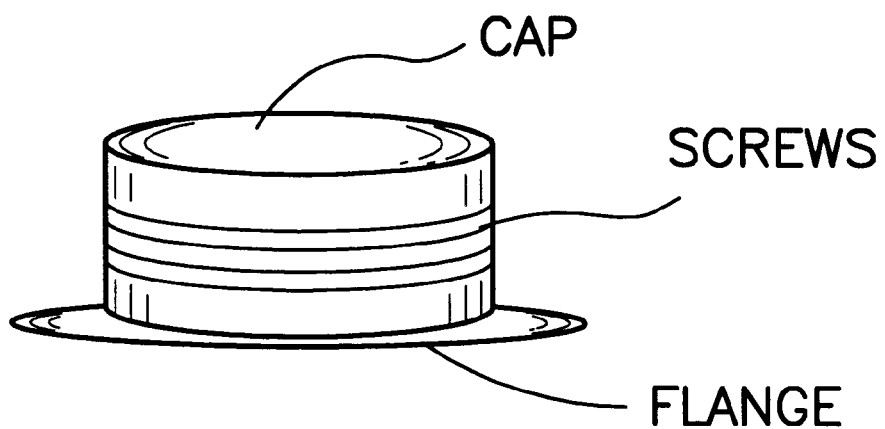

There is illustrated in FIG. 2 an isolated view of the fitment applicator apparatus of the present invention;

There is illustrated in FIGS. 3–9 isolated views of the apparatus during an application cycle wherein an erected carton has a fitment attached thereon as the erected carton is transferred from a magazine/carton opener to a bottom forming station of the packaging machine;

There is illustrated in FIG. 10 a top perspective of a gable top carton;

There is illustrated in FIGS. 11A and 11B fitments.

DETAILED DESCRIPTION OF THE INVENTION

The present invention is directed in particular to a linear form, fill and seal packaging machine for gable-top cartons such as a TETRA REX® machine available from Tetra Pak, Incorporated of Chicago, Ill. The present invention allows for various size cartons to be produced on a single machine, and even two different sizes of cartons to be produced on a single machine simultaneously.

Figure 1:
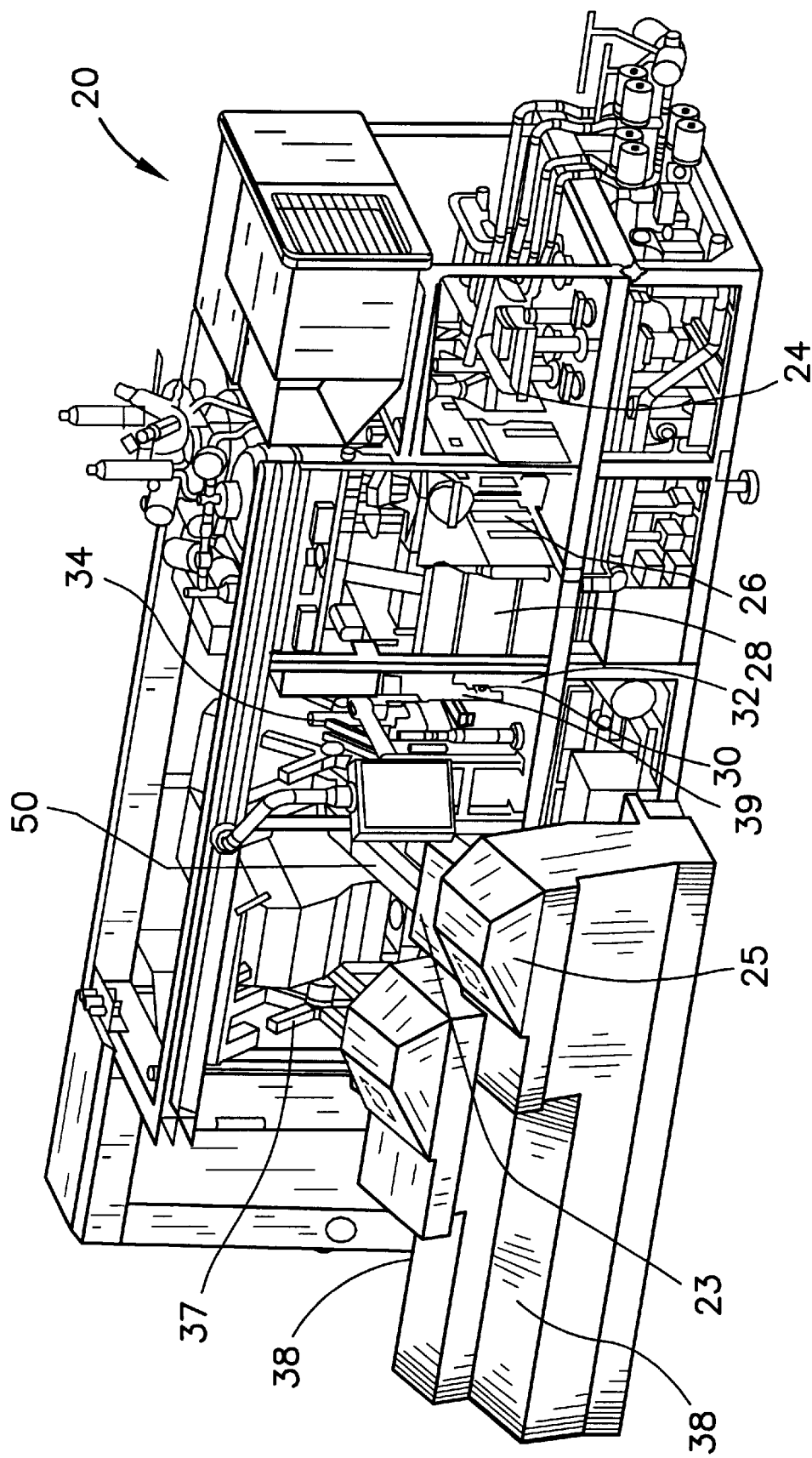

As shown in FIG. 1, a dual line packaging machine 20 for forming, filling and sealing cartons generally includes on each line a high hygiene zone 22 which is composed of a top sealing station 24 and a filling station 26, a sterilization station 28 which is composed of an ultraviolet radiation station 30 and a hydrogen peroxide station 32, a fitment applicator station, a bottom forming station 36, a modular carton opener 23 and 25, and a carton blank magazine 38. From an operational perspective, the front 40 of the packaging machine 20 is where the processing begins, and the rear 42 is where the finished cartons are dispensed for distribution.

As shown in FIG. 2, the fitment applicator apparatus of the present invention is generally composed of a pair of anvils 52 and 54, an ultrasonic horn 56, chutes 58 and 60 for delivery of fitments to the anvils 52 and 54. Carton guide rails 64 and 66 deliver an erected carton from a magazine/carton opener to the packaging machine. On each of the anvils 52 and 54 is a lobe 68a–b that engages with a fitment 70 from the each of the chutes 58 and 60. Alternatively, the lobe 68 may be replaced by some other fitment engagement means such as a vacuum mechanism. Each of the anvils 52 and 54 are respectively connected to oscillating rods 72 and 74. The anvils 52 and 54 are crescent shape with a lobe 68a–b on one end and pivotally connected to rods 72 and 74 at the other end. The rods 72 and 76 are themselves connected to a toothed drive belt 76. The toothed drive belt is connected to a step motor positioner that may be controlled by control system for the packaging machine. The timing of the applicator cycle and the indexed movement of containers 47 may be controlled by Programmable Logic Circuit ("PLC") through servo amplifiers and servomotors. A preferred control system is disclosed in U.S. Pat. No. 5,706,627 for a Control System For A Packaging Machine which is hereby incorporated by reference in its entirety, and which has the same assignee as the present application.

The apparatus 50 is positioned in relation to the carton guide rails 64 and 66 where the carton 47 is transferred from a magazine/carton opener to the bottom forming station, or some other station on the form, fill and seal packaging machine 20. As will be described further in reference to FIGS. 3–9, a fitment 70 is applied to each erected carton as it moves along the guide rails 64 and 66.

Figure 3:
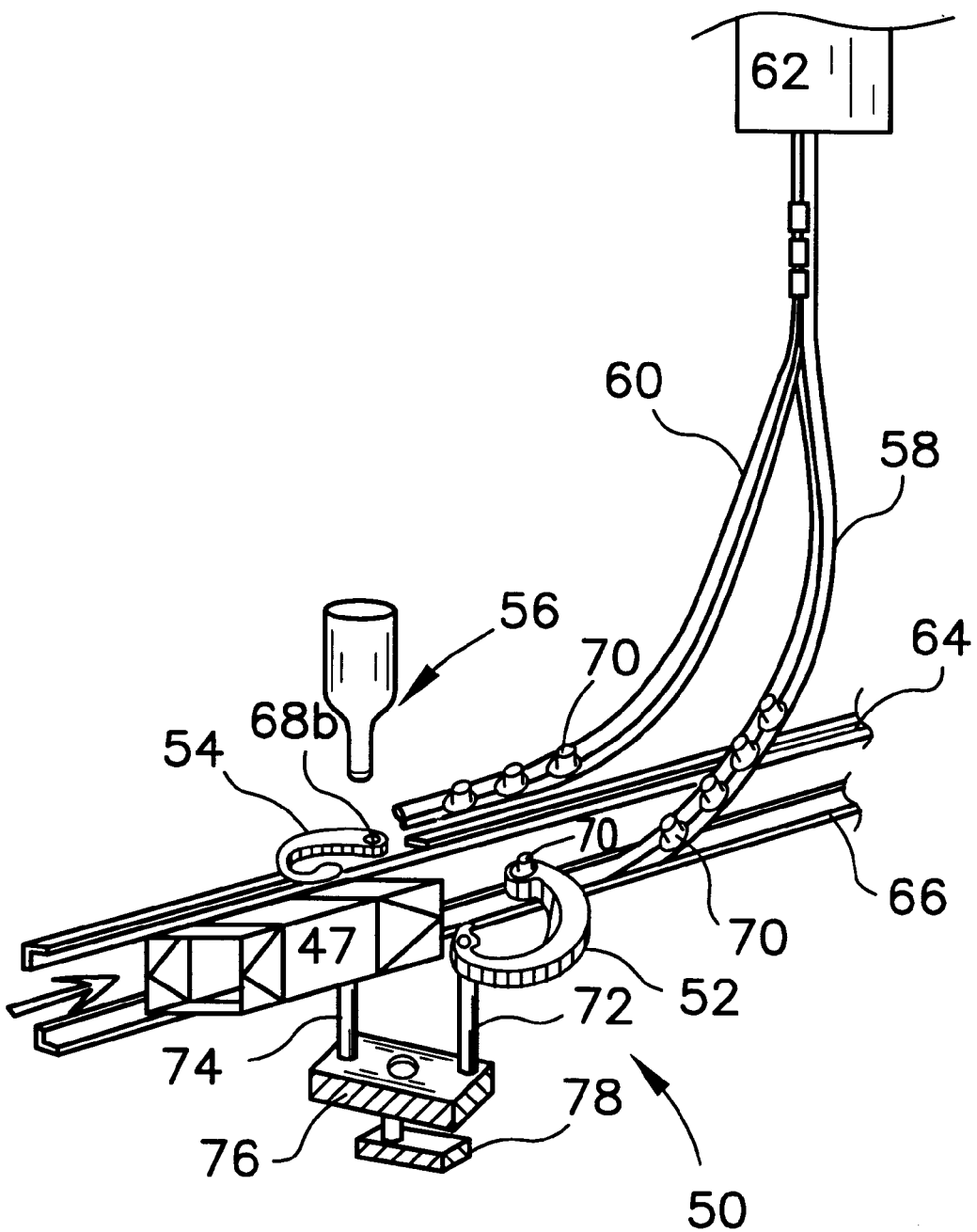

As shown in FIG. 3, a carton 47 is transferred to the apparatus 50. In one preferred method, the carton 47 pauses momentarily at the apparatus 50 for application of a fitment 70 thereon. The first anvil 52 has previously picked a fitment 70 from the chute 58 that is now held on the lobe 6a, not shown, at one end of the anvil 52. Each of the anvils 52 and 54 are in an extended allowing for free movement of the carton 47 along the guide rails 64 and 66. The anvils 52 and 54 are also in a lowered positioned. This lowered position allows for the anvils 52 and 54 to oscillate between an extended position and a retracted position along a lower horizontal plane. This oscillation allows for placement of the anvil 52 with the fitment 70 temporarily attached thereon into the open top end of the carton 47.

Figure 4:
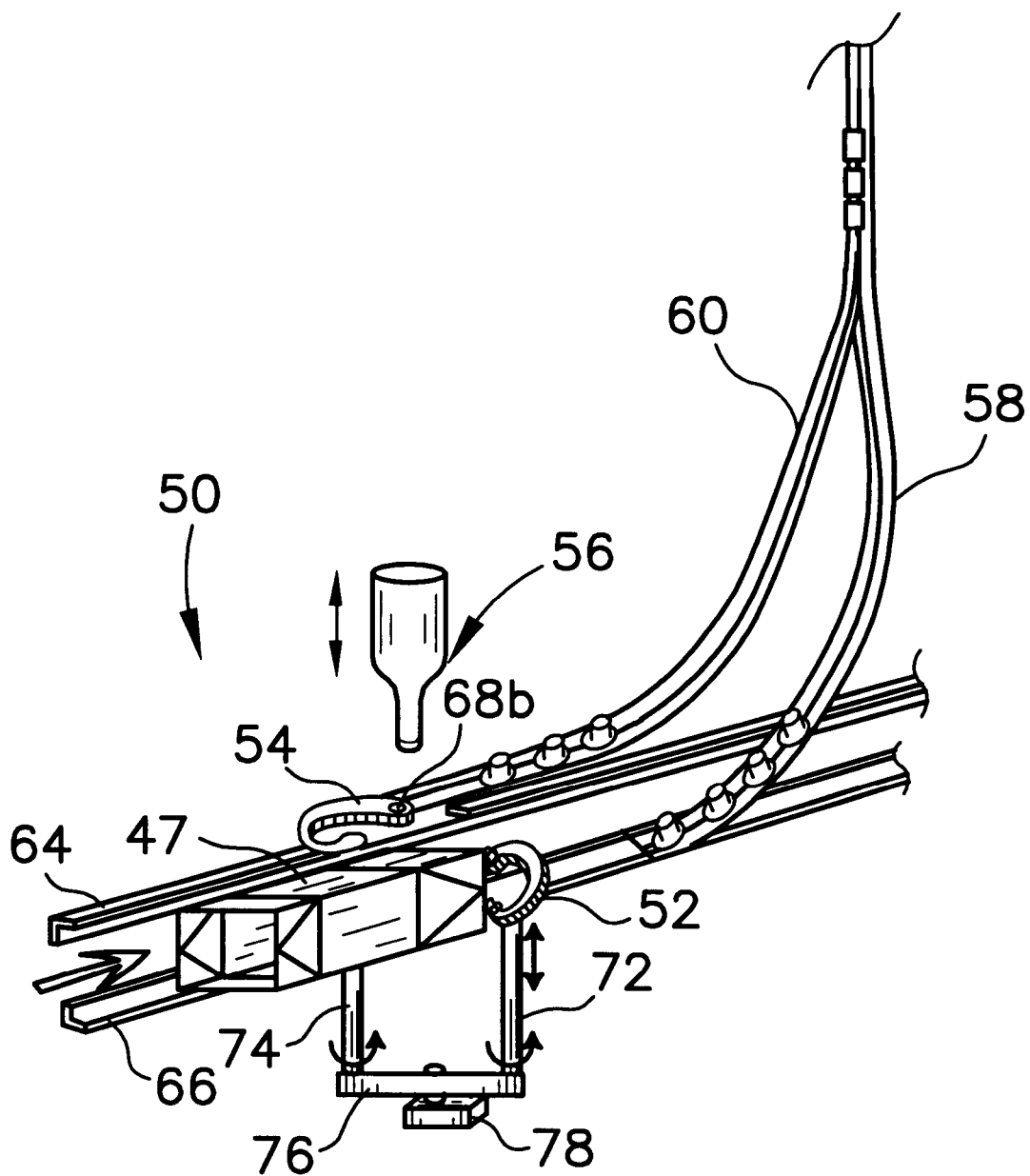

As shown in FIG. 4, the anvil 52 is now inside of the carton 47, directly under a pre-punched hole 49. The toothed drive belt 76 has repositioned itself to lessen the amount of oscillation of the anvil 52 by oscillating rod 72. The second anvil 54 is now in position for picking a fitment 70 from the second chute 60.

Figure 5:
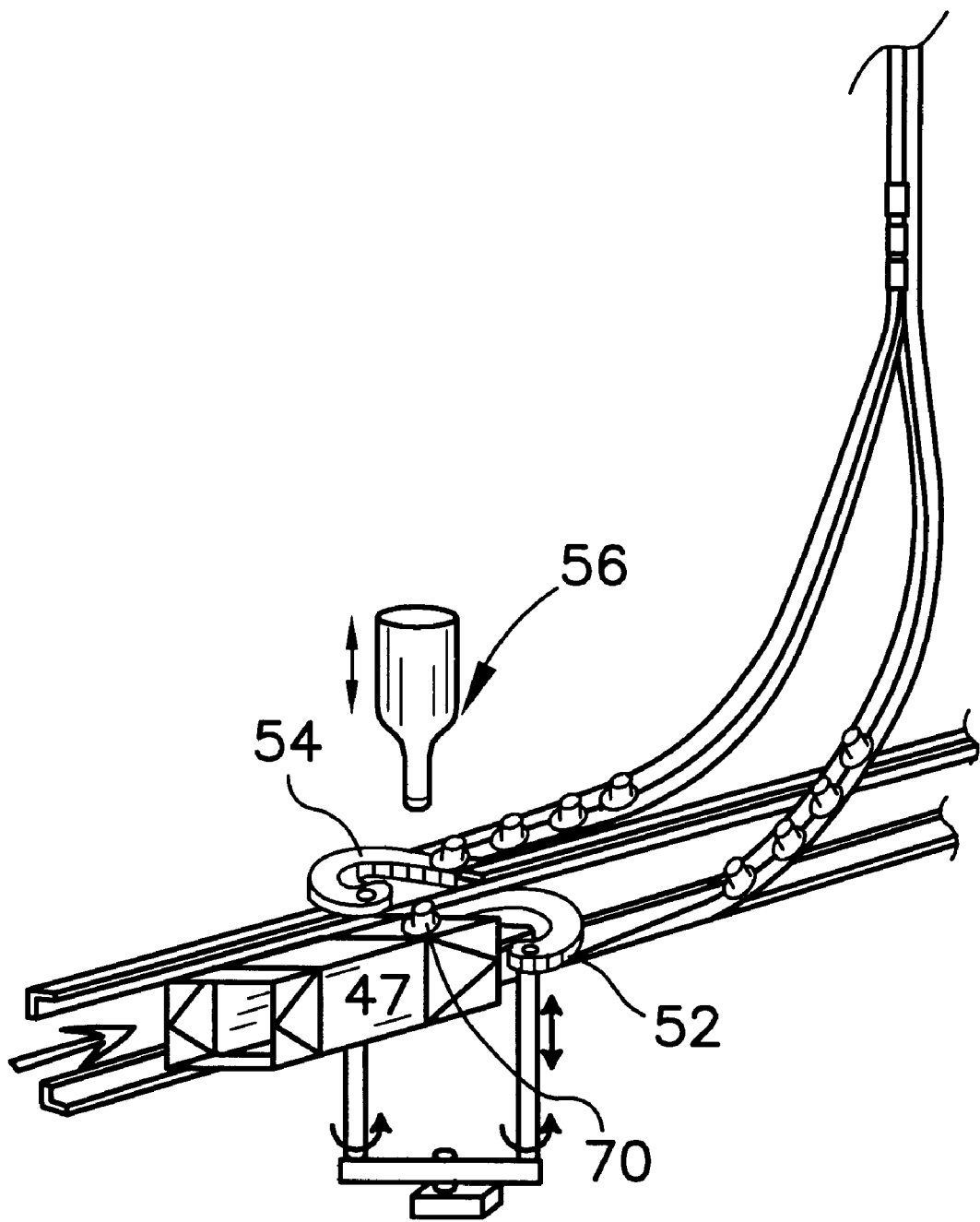

As shown in FIG. 5, both anvils 52 and 54 are now in a raised position due to the action of the step motor positioner 78. The fitment 70 attached to the lobe 68a of the first anvil 52 has been inserted from the inside of the carton 47 through the pre-punched hole 49. The flange of the fitment 70 mates with the interior of the carton 47 about the pre-punched hole 49. As the fitment 70 is inserted through the hole 49, the ultrasonic horn 56 is lowered toward the carton 47. During ultrasonic sealing, the sonotrode 48 transfers ultrasonic energy to the container and flange thereby welding the flange to the container 52. Once at the activation position, the ultrasonic horn 56 generate-an ultrasonic sound which vibrates for a predetermined time and at a frequency sufficient to weld the flange of the fitments 70 to the interior of the wall of each of the containers 52.

The flange of the fitments 70 is buttressed by the anvils 52 and 54 which has sufficient inertia to allow for the proper welding of the flange of each of the fitments 70 to the wall of the containers 47. If the anvils 52 and 54 do not possess sufficient inertia, then the fitments 70 might not be completely welded to the containers 47, or the cap might be welded to the spout of each of the fitments 70. Once each of the fitments 40 is properly welded to each of the containers 47, the anvil 52 is ready for retraction from the attachment position.

Figure 6:
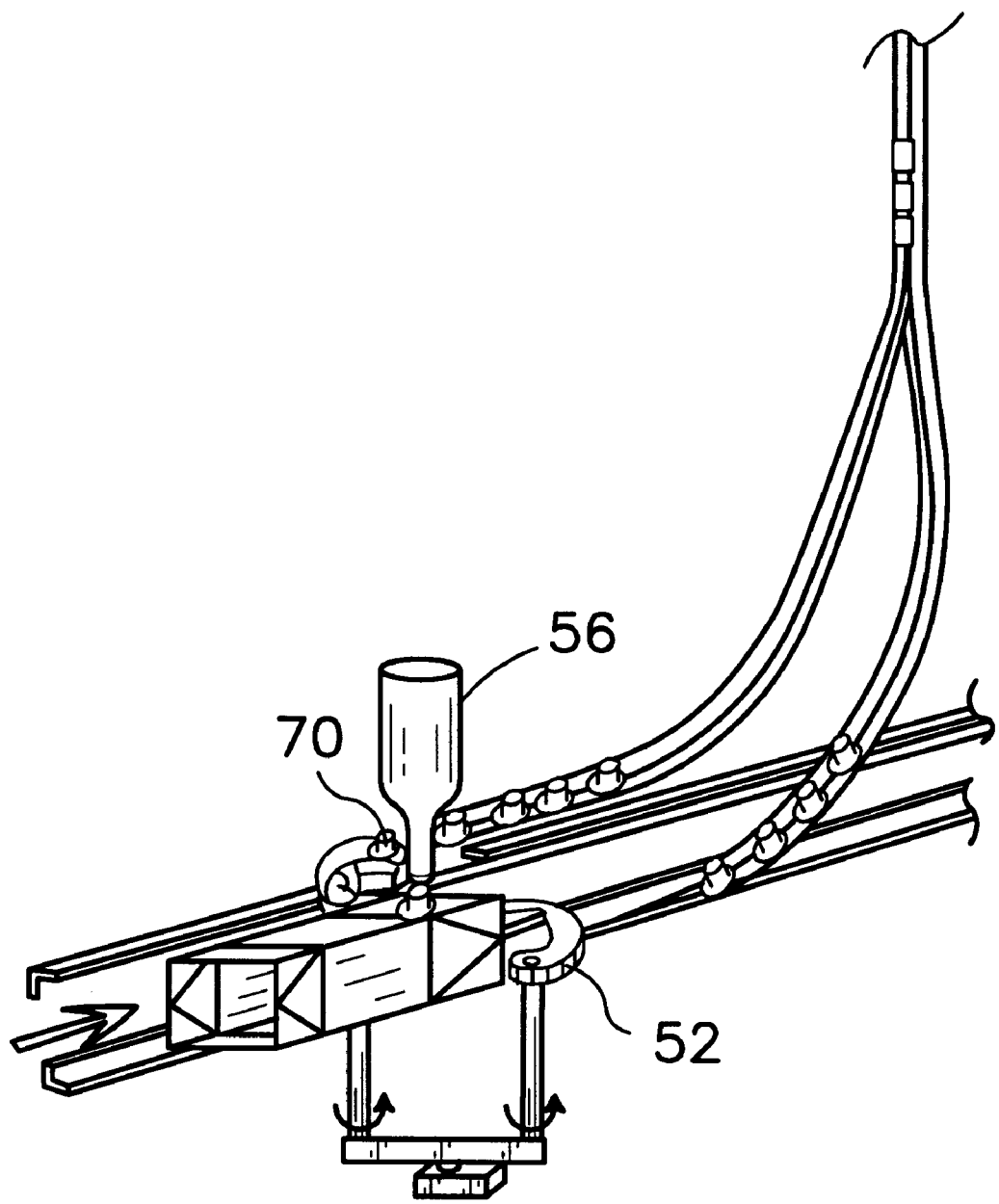
Figure 7:
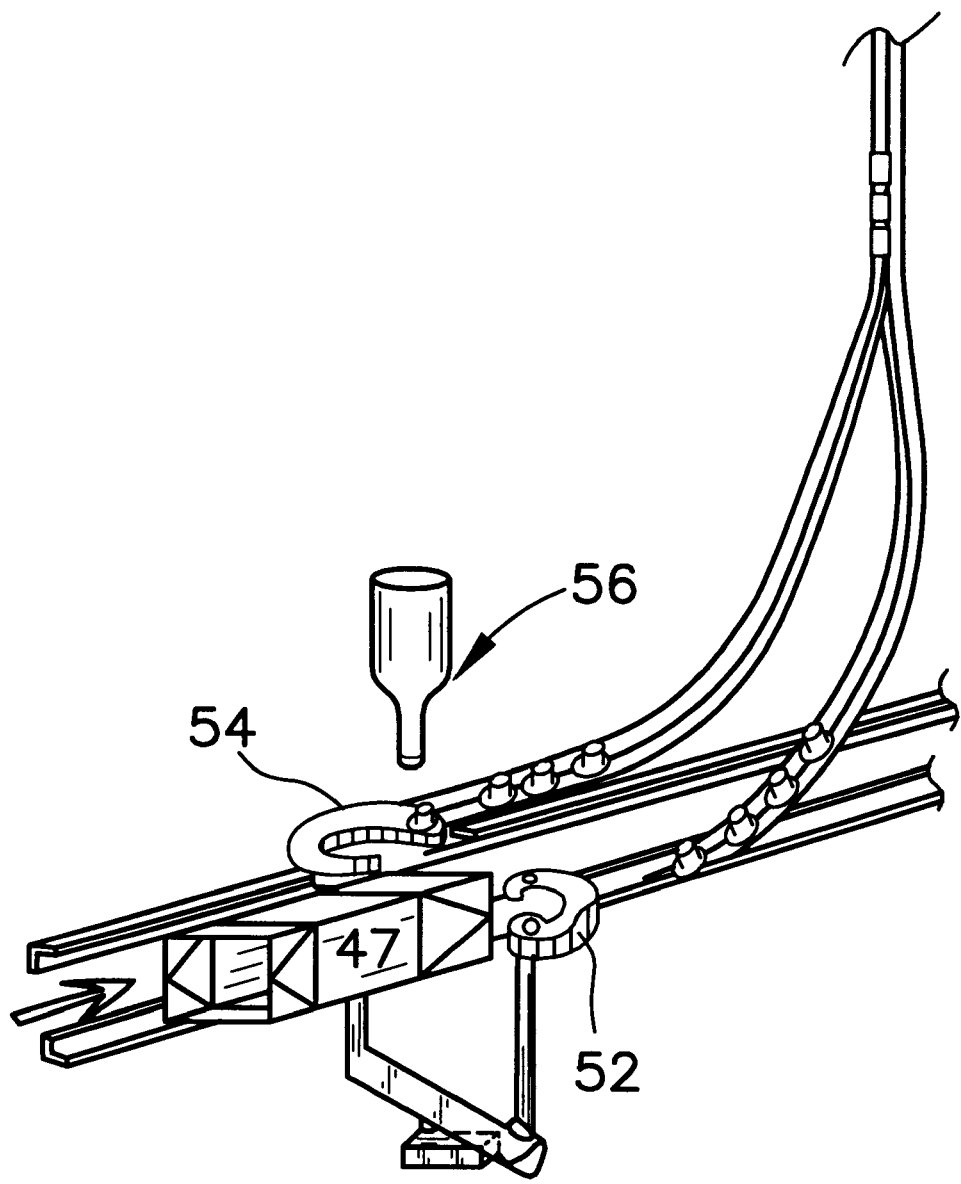
Figure 8:
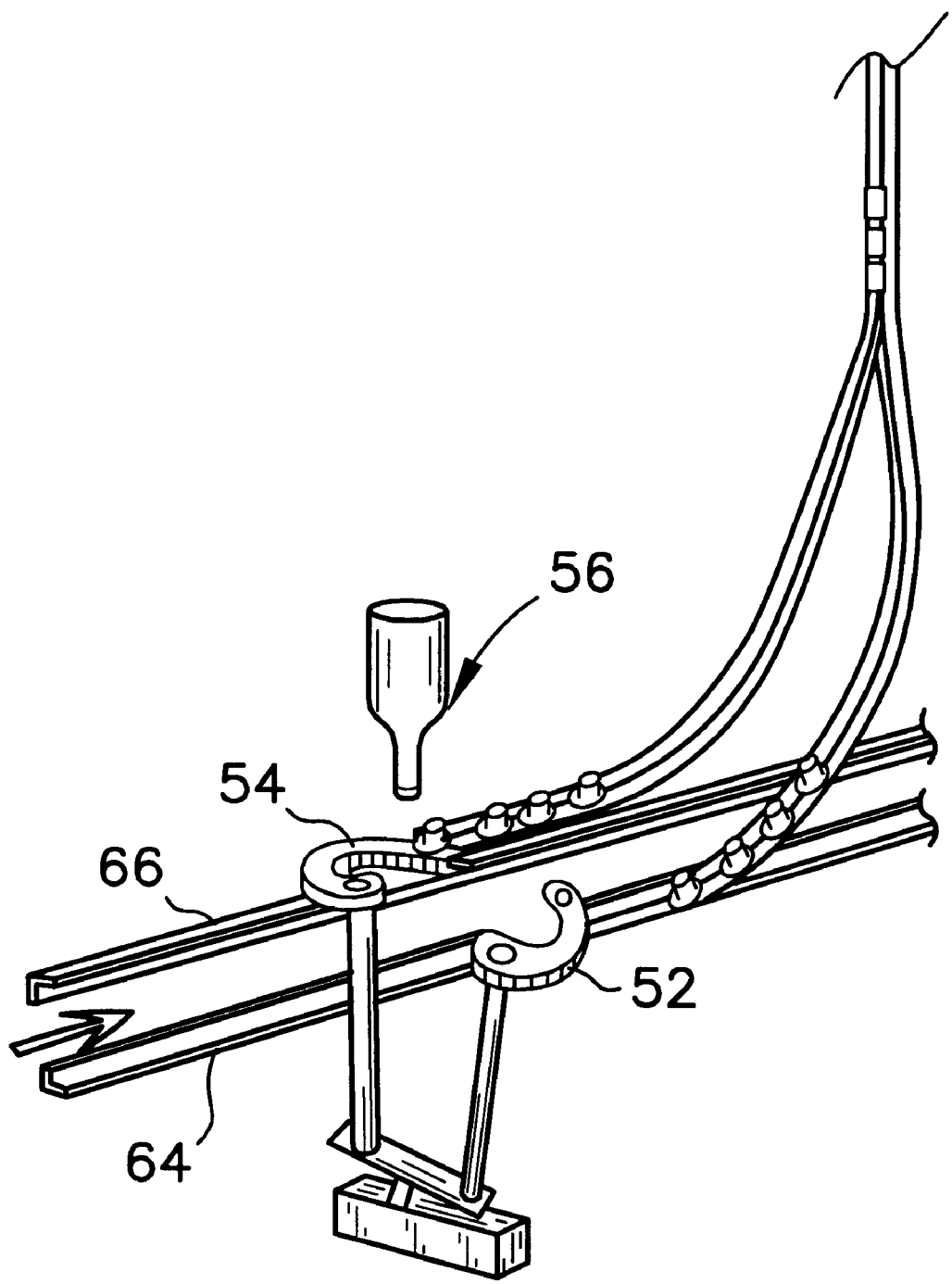
Figure 9:
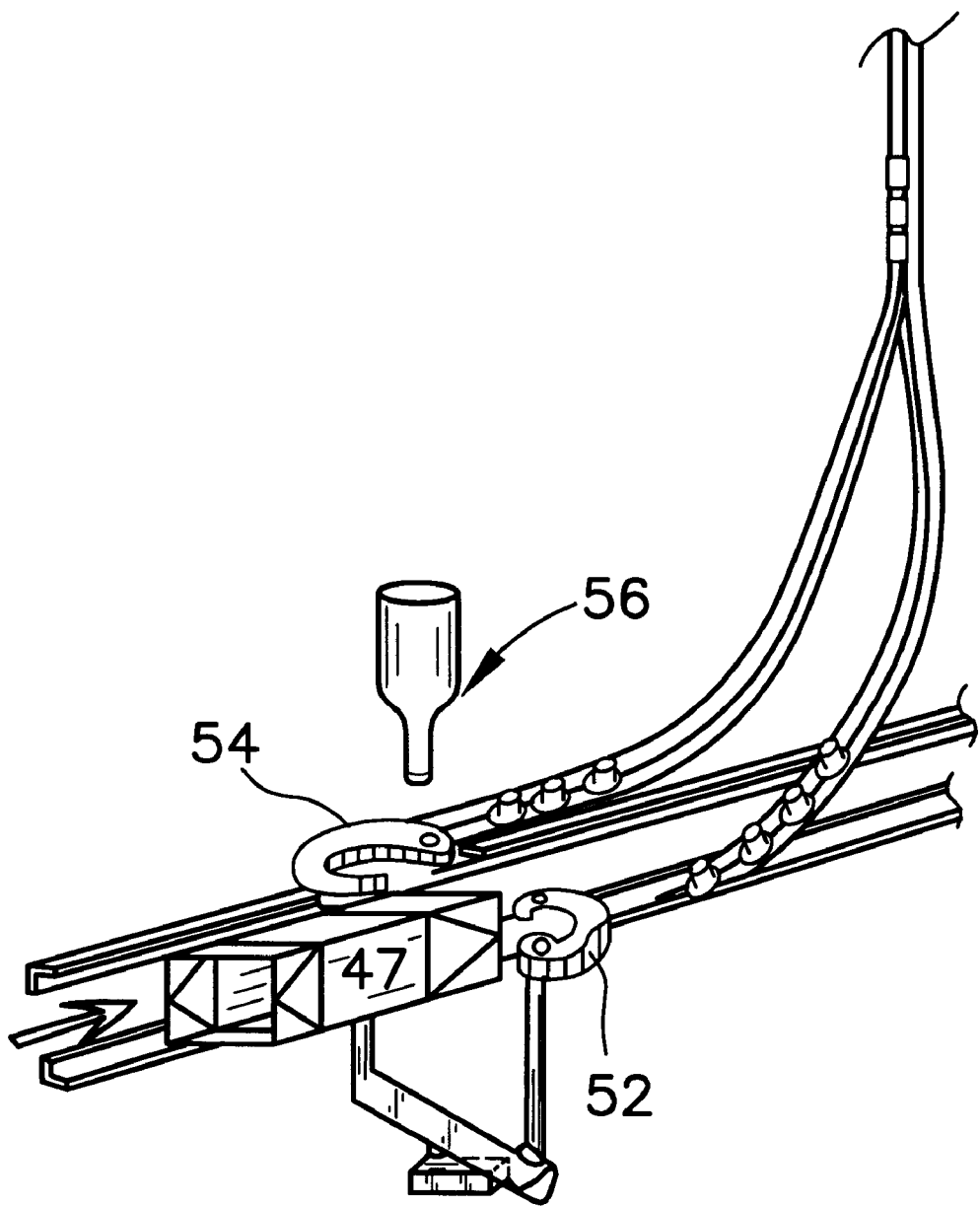

As shown in FIG. 6, the anvils 52 and 54 are lowered to the first horizontal plane so that anvil 52 may be retracted from the carton 47. The ultrasonic horn 56 is raised to a holding position until a fitment 70 is to be attached to a new carton 47. The second anvil 54 has its fitment 70 attached and it is prepared to enter the new carton. As is apparent to those skilled in the art, the entire application cycle occurs very quickly in order to maintain a high production of cartons 47 on the packaging machine 20. As shown in FIG. 7, the first anvil 52 is removed from the carton 47 thereby creating a clear path for the carton 47 to travel along the guide rails 64 and 66 to the bottom forming station on the packaging machine 20. As shown in FIG. 8, the carton 47 has been transferred from the apparatus 50 in anticipation of a new carton 47. As shown in FIG. 9, a new carton is transferred to the apparatus 50 for application of a fitment 70 from the second anvil 54.

The use of two anvils 52 and 54 allows for a shorter fitment application cycle since one of the anvils is picking a fitment while the other anvil is applying a fitment to the carton 47.

FIG. 10 shows a formed, filled and sealed gable top carton 47 with a fitment 70 attached thereon. FIG. 11A and 11B show different fitments 70 such as a flip-cap 70a and a screw cap fitment 70b.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

I claim as my invention:

1. A method for attaching a fitment to an erected carton as the carton is transferred from a magazine to a packaging machine along and between a pair of guide rails, the carton being erected and horizontally oriented and being conveyed horizontally, the method comprising:

provinding an erected carton for conveyance along and between the guide rails;

providing a pair of anvils, one of each of the pair of anvils disposed about and associated with one of each of the pair of guide rails;

oscillating a first one of the pair of anvils in a first plane, with a fitment thereon, into an interior portion of the erected carton;

moving the first one of the pair of anvils in a second plane, generally transverse to the first plane, to insert the fitment from the interior portion of the carton through a pre-punched hole in the carton;

engaging an ultrasonic horn with the fitment inserted through the hole of the carton;

welding the fitment to the carton;

oscillating and moving the first one of the pair of anvils through the first and second planes, respectively, out of the interior portion of the carton and into a position for receipt of a subsequent fitment;

providing a second erected carton for conveyance along and between the guide rails;

oscillating a second one of the pair of anvils in a first plane, with a second fitment thereon, into an interior portion of the second erected carton;

moving the second one of the pair of anvils in a third plane, generally transverse to the first plane and parallel to the second plane, to insert the second fitment from the interior portion of the second carton through a pre-punched hole in the second carton;

engaging an ultrasonic horn with the second fitment inserted through the hole of the welding the fitment to the second carton; and oscillating and moving the second one of the pair of anvils through the first and third planes, respectively, out of the interior portion of the second carton and into a position for receipt of a subsequent fitment.

2. The method in accordance with claim 1 wherein the step of oscillating the second one of the pair of anvils in the first plane with a second fitment thereon, into an interior portion of the second erected carton is carried out substantially contemporaneously with the step of moving the first one of the pair of anvils in the second plane, generally transverse to the first plane, to insert the fitment from the interior portion of the carton through a pre-punched hole in the carton.

3. A method for attaching a fitment in accordance with claim 1 wherein the anvils oscillate in a generally opposing orientation relative to one another.

4. An apparatus for applying a fitment to an erected carton as the carton is transferred from a magazine to a packaging machine, the apparatus comprising:

a pair of guide rails along which the carton is conveyed, the carton being positioned in a horizontal manner between one of each of the pair of guide rails;

a pair of anvils, one of each of the pair of anvils disposed about and associated with one of each of the pair of guide rails, each of the anvils having a lobe thereon for engagement with a fitment;

a pair of chutes for delivering a supply of fitments from a source, one of each of the pair of chutes delivering fitments to one of each of the pair of anvils, the anvils being movable in a first plane through a generally horizontal path defining a first generally horizontal plane from a position outside of the cartons to a position interior of the cartons, the anvils configured to carrying the fitments from the position outside of the cartons to the position interior of the cartons;

means for moving each of the anvils independent of each other through the first generally horizontal plane;

means for moving each of the anvils between the first horizontal plane and a second horizontal plane; and an ultrasonic horn disposed about the guide rails, the ultrasonic horn adapted for movement in a vertical plane, substantially parallel to the movement of the anvils between the first and second horizontal planes, wherein the anvils are independently movable in the first and second planes.

5. The apparatus in accordance with claim 4 wherein the anvils are movable in the first horizontal plane through an arcuate path.

6. The apparatus in accordance with claim 4 wherein the anvils are movable through the second plane in a generally straight-line path.

7. The apparatus in accordance with claim 4 wherein the anvils are adapted to oscillate in an opposing orientation relative to each other.

8. The apparatus according to claim 4 wherein each of the anvils is crescent shape having a lobe on one end and engaged with an oscillating rod on the other end.

\* \* \* \* \*